April 25, 1967 H. O. KYLIN 3,315,550
CUTTING-OFF LATHE WITH OPPOSED SYNCHRONIZED TOOL SLIDES
Filed Sept. 25, 1964 11 Sheets-Sheet 1

INVENTOR.
HENRIK O KYLIN
ATTORNEY

INVENTOR.
HENRIK O. KYLIN
BY
ATTORNEY

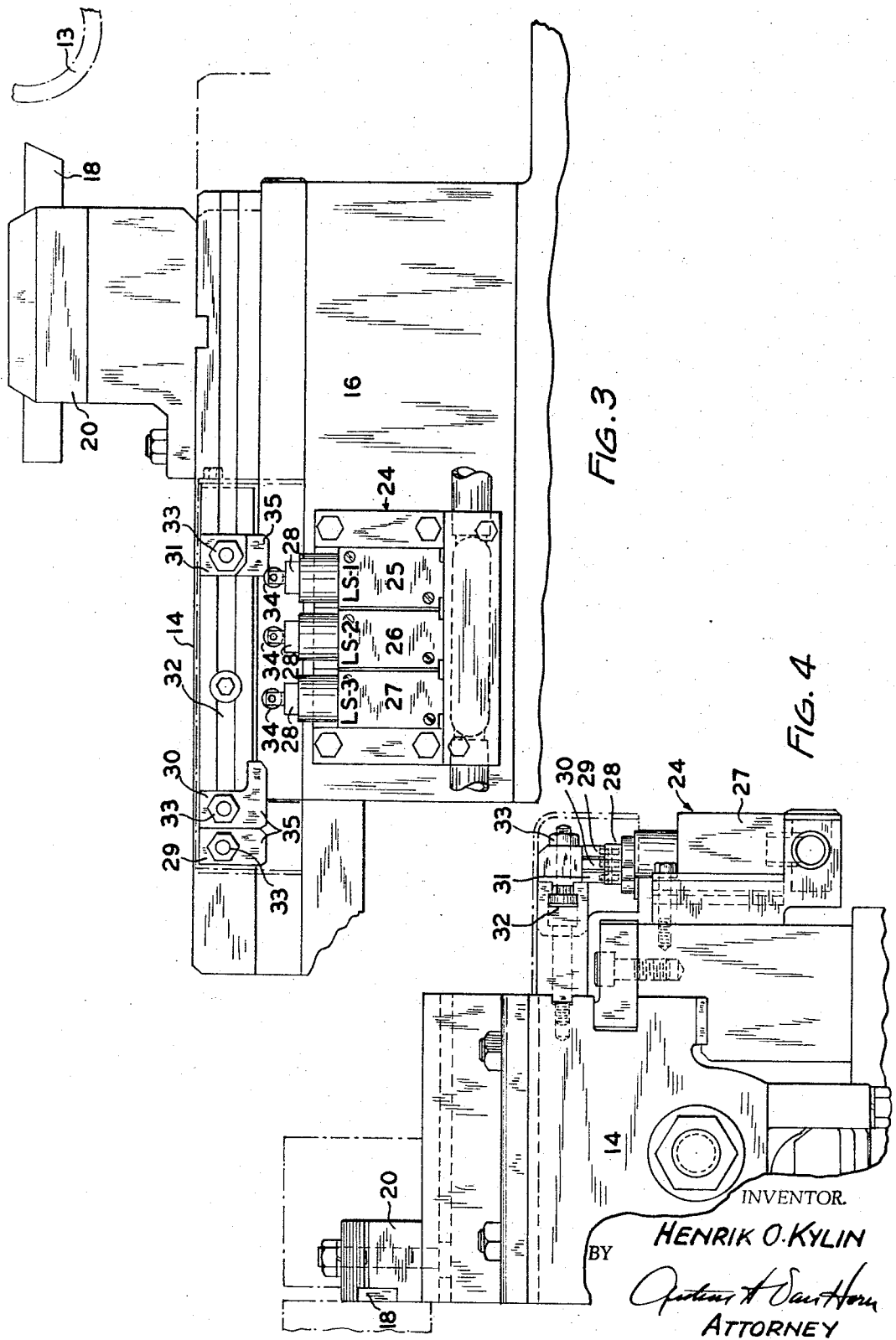

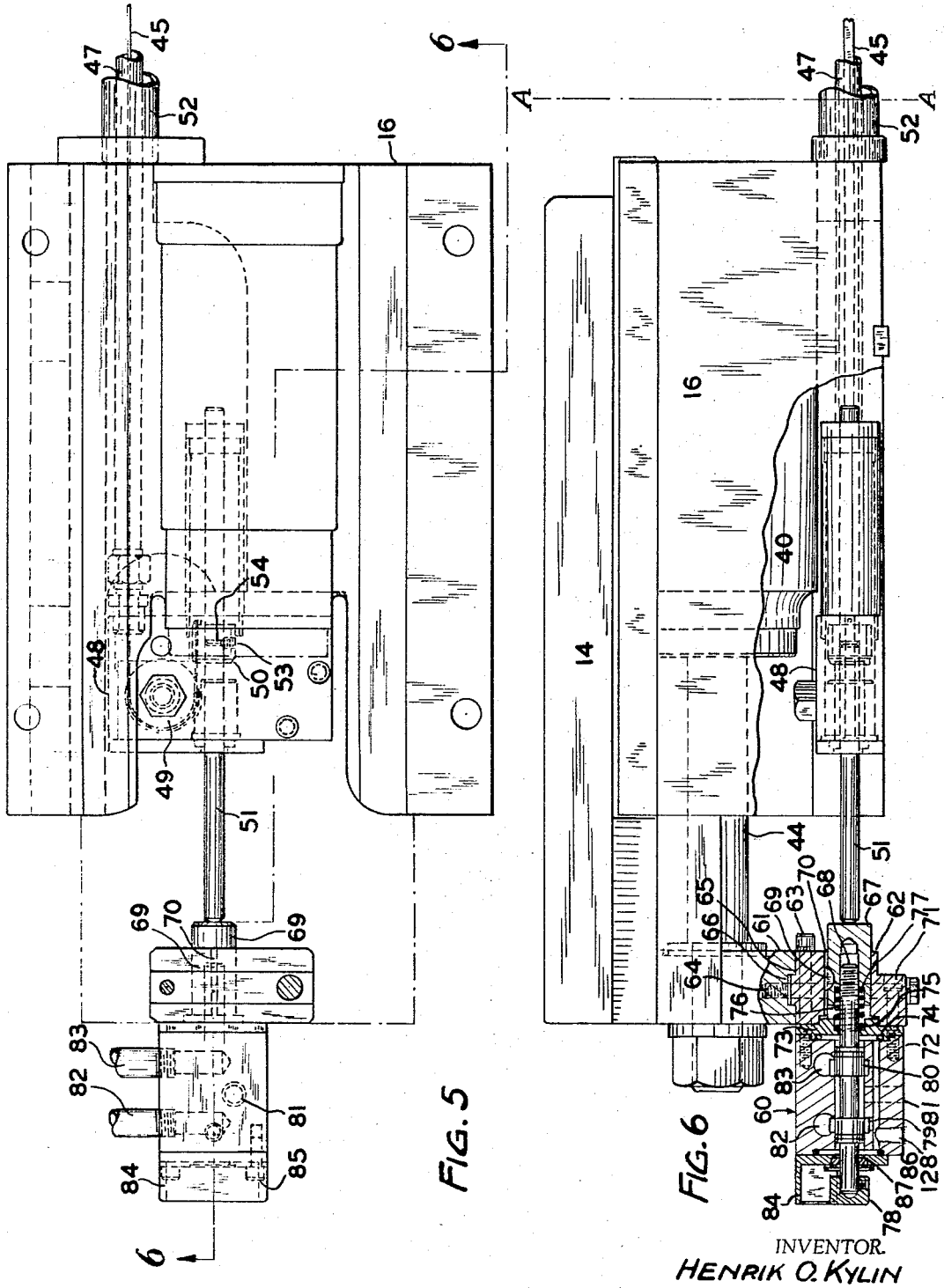

April 25, 1967  H. O. KYLIN  3,315,550
CUTTING-OFF LATHE WITH OPPOSED SYNCHRONIZED TOOL SLIDES
Filed Sept. 25, 1964  11 Sheets-Sheet 5
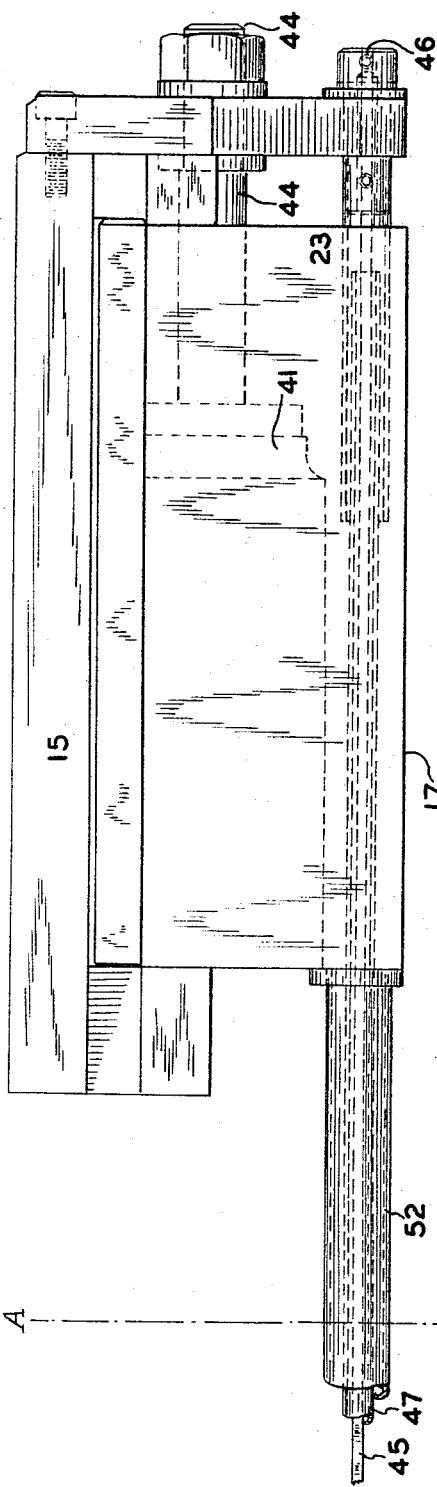
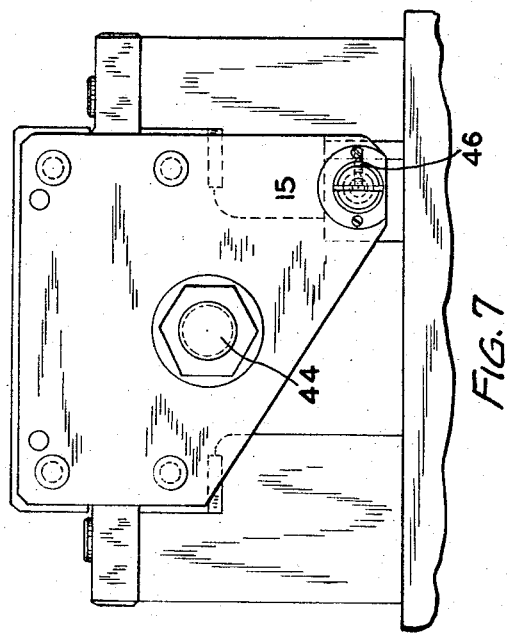
INVENTOR.
HENRIK O. KYLIN
BY
ATTORNEY

INVENTOR.
HENRIK O. KYLIN
ATTORNEY

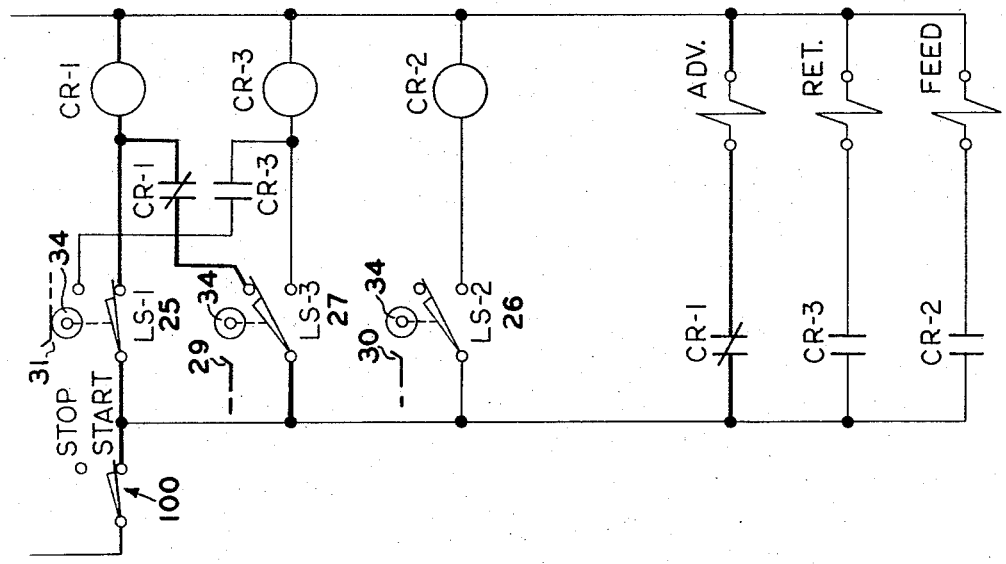
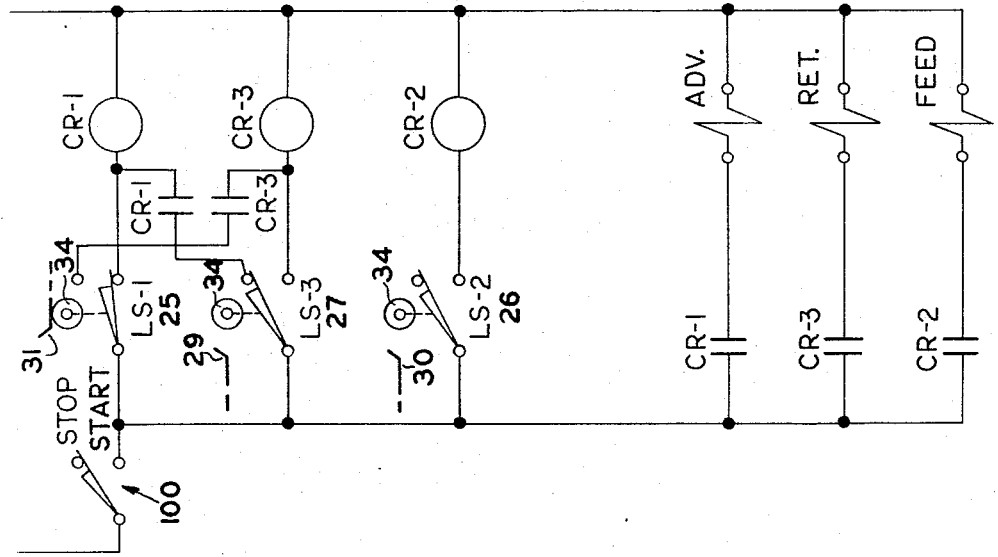

April 25, 1967  H. O. KYLIN  3,315,550
CUTTING-OFF LATHE WITH OPPOSED SYNCHRONIZED TOOL SLIDES
Filed Sept. 25, 1964  11 Sheets-Sheet 11

INVENTOR.
HENRIK O. KYLIN
BY
ATTORNEY

United States Patent Office 3,315,550
Patented Apr. 25, 1967

3,315,550
CUTTING-OFF LATHE WITH OPPOSED SYNCHRONIZED TOOL SLIDES
Henrik O. Kylin, Aurora, Ohio, assignor to Bardons & Oliver, Inc., Cleveland, Ohio, a corporation of Ohio
Filed Sept. 25, 1964, Ser. No. 399,235
9 Claims. (Cl. 82—21)

This invention relates to cutting-off lathes and the like and more particularly to machines of this character employing opposed synchronized tool slides movable transversely of the axis of a rotating workpiece.

An important object of this invention is to maintain strict synchronization of the tool slides during their movement regardless of the cutting load encountered by the tools or cutters engaging the workpiece on which a cutting-off operation is performed.

Another important object of this invention resides in the provision of means whereby the relative positions of the tool slides may readily be adjusted one with respect to the other.

Another object of the invention is the substantial elimination of backlash in the movement of the opposed slides in either "ADVANCE" or "RETURN" cycle by employing novel means for such purpose.

Another object of this invention is to maintain a highly accurate synchronization of the slides in their movement in either direction during rapid traverse or during a feed movement.

Still another object is in the provision of means permitting rapid traverse of the slide in approach and return with respect to the workpiece.

Still another object is the provision of actuating means for the tool slides which means is disposed and operates in a direction substantially parallel to the axis of movement of the tool slides.

Another object of the invention is to provide such actuating means employing a tape and associated element by which backlash may be substantially eliminated in the operation of the slides.

Still another object of the invention is to accomplish the objects and advantages heretofore mentioned by extremely simple mechanism at a high rate of efficiency and at lower cost than has heretofore been possible.

Other objects and advantages of this invention will become more apparent as the following description of an embodiment thereof progresses, references being made to the accompanying drawings in which like reference characters are employed to designate like parts throughout the same.

In the drawings:

FIGURE 3 is an enlarged side view of one of the opposed tool slides and the associated control mechanism for both slides;

FIGURE 4 is a rear end view looking toward the right in FIGURE 3;

FIGURE 5 is a top plan view of the saddle at the left hand end of FIGURE 2;

FIGURE 6 is a partial sectional side view taken on line 6—6 of FIGURE 5;

FIGURE 6A shows the right hand end of the mechanism shown in FIGURE 2, the line A—A in FIGURE 6 indicating the point at which FIGURE 6A is separated therefrom;

FIGURE 7 is a rear end view looking toward the left in FIGURE 6A;

Figure 15:
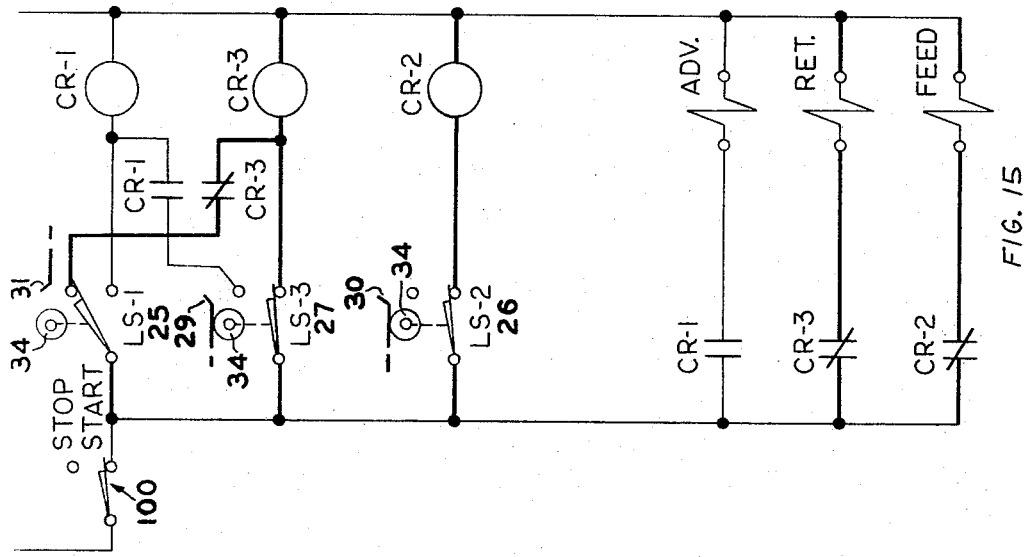
Figure 14:
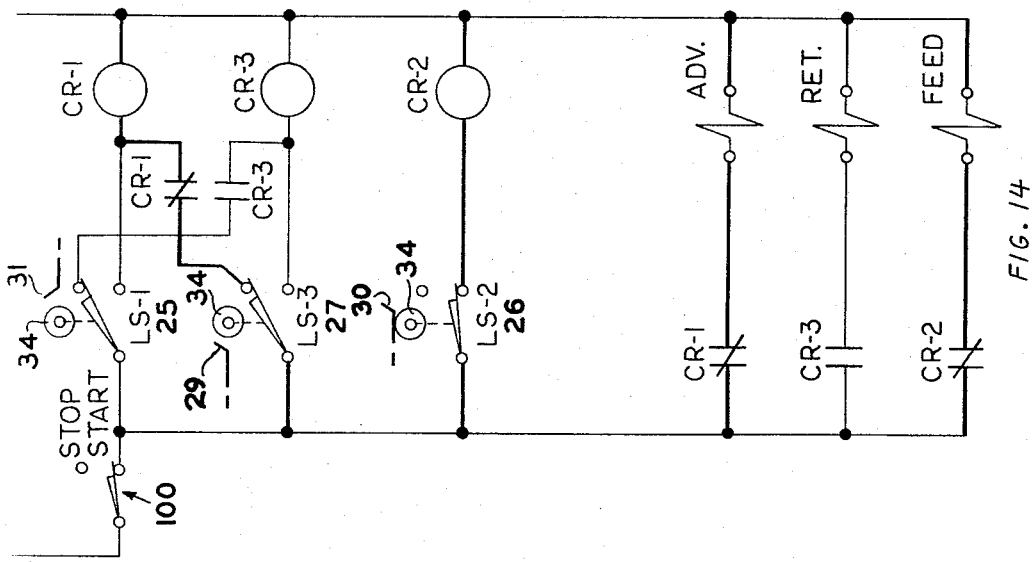

FIGURE 12 is a diagram of electrical circuitry which may be employed, including switches operable to energize selected solenoids which in turn operate valves selectively to carry out the slide "ADVANCE" and "RETURN" movements and the "FEED" of the cutters after advance to engage the workpiece which is to have a portion cut off; in this figure the circuits are deenergized since the STOP-START switch is in "OFF" position;

FIGURE 13 illustrates the circuit conditions under which the slides ADVANCE at a traverse rate, and the holding circuit which is maintained while the slides are advancing to begin FEED;

FIGURE 14 illustrates the circuit conditions existing during slide ADVANCE at FEED rate; and FIGURE 15 illustrates the circuit conditions when slide RETURN is initiated.

Referring now to the drawings, which are illustrative of an embodiment of my invention, the construction and operation may be described as follows:

The head stock of the machine may be of usual design, there being means by which the workpiece (pipe, tubing, bar stock or the like) may be rotated and fed through the work spindle assembly in predetermined lengths for each cutting operation.

The head stock is indicated at 10, the work spindle at 11 and the piece gripping collet at 12 through which a workpiece 13 is fed to a predetermined length and then clamped in the collet preparatory to a cutting-off operation on the piece.

According to this invention, there are provided a pair of opposed cutter or tool slides 14 and 15 disposed transversely of the turning axis of the workpiece and adapted to travel along the saddles 16 and 17, respectively, in accurate synchronization to each other and in a direction transverse to the work axis, in response to the actuation of control mechanism hereinafter to be described, to produce rapid approach, feed and rapid return of the cutters 18 and 19 mounted in the holders 20 and 21, respectively, adjustably fixed to the slides.

The slides are supported on saddles 16 and 17, and the beds 22 and 23, respectively, and a bank of laterally offset cut-off control units (see FIGURE 4), indicated generally at 24, is mounted on the saddle 16 in a fixed position thereon. These control units include the switches 25 (rapid approach), 26 (feed), and 27 (rapid return), each coupled with a roller actuated plunger, as at 28.

Figure 1:
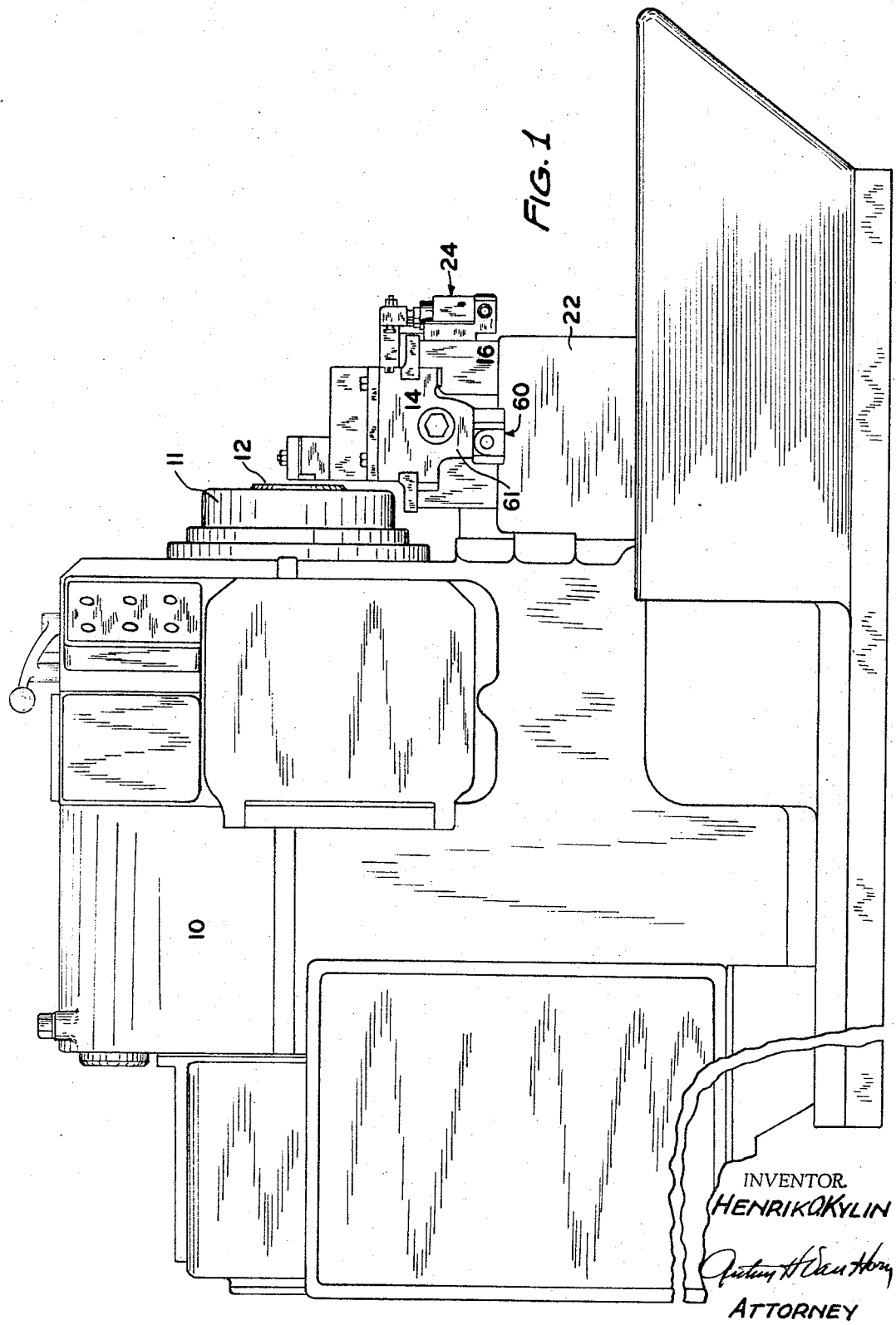
FIGURE 1 is a side elevation of a cutting-off lathe showing an embodiment of my invention assembled thereon.
Figure 2:
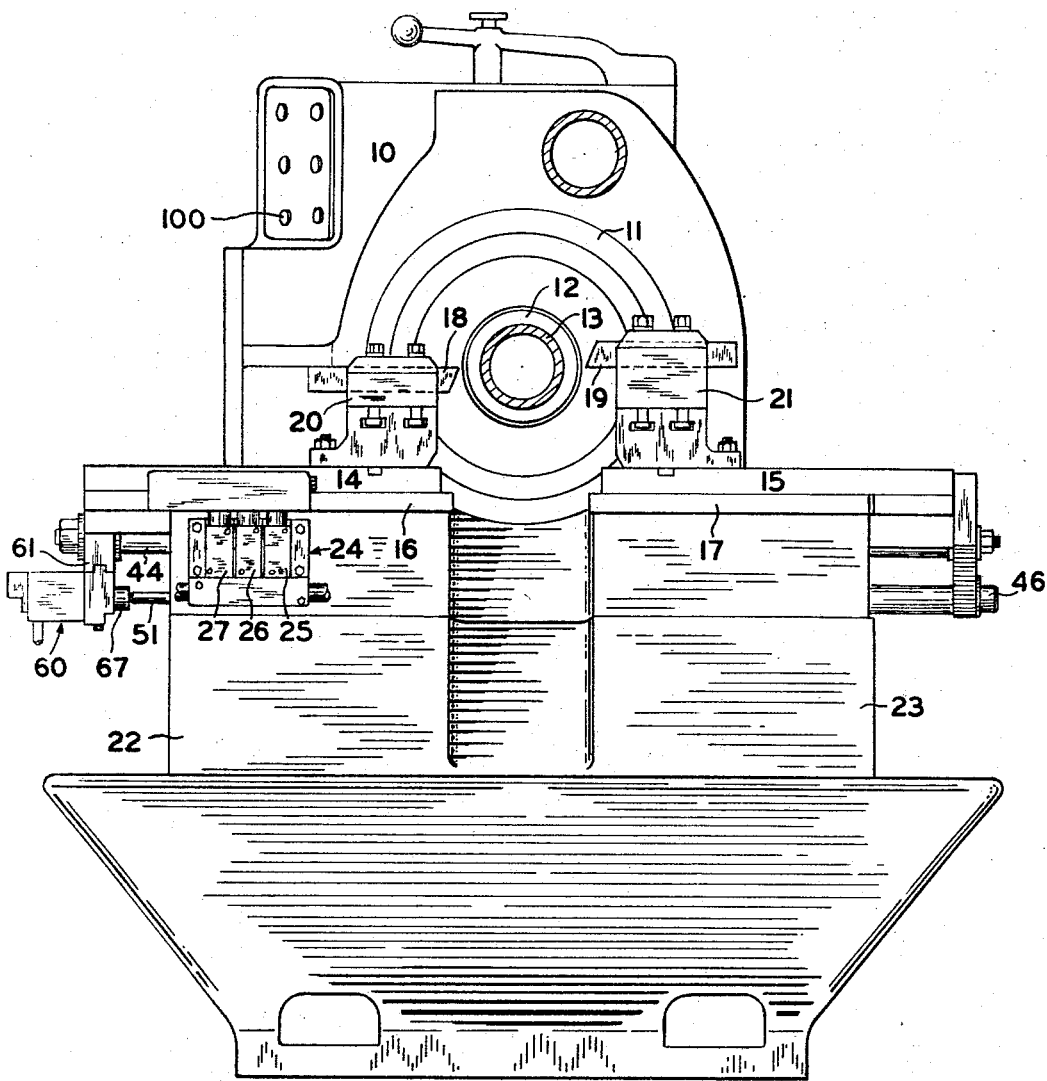
FIGURE 2 is an elevation facing in the direction of the front of the head stock of the machine and shows the opposed tool or cutter slides in position on the machine and also shows the switches and valve control means.

Referring to FIGURES 2 and 3, and more particularly FIGURE 3, it will be seen that control blocks 29, 30 and 31 are adjustably carried in a T slot 32 formed in an extension of the slide 14 and these control blocks are each individually secured in an adjusted position along the slot by means of the bolts 33 in the desired adjusted position. These control blocks are also offset corresponding to the offset control units 25, 26 and 27, and are provided with depending portions having roller engaging surfaces 35 lying in the path of the periphery of the respective rollers and selectively engageable therewith as the opposed slides move transversely of the rotational axis of the workpiece.

As shown in FIGURE 3, the control block 31 is shown in position to engage the roller 34 carried by the RAPID FORWARD unit 25 which is closest to the saddle 16. The control block 30 is offset laterally outwardly of the saddle and of the block 31 so that its undersurface 35 is in position to engage and depress the roller 34 carried by the FEED unit 26 when the slides have been advanced toward the workpiece at the end of the RAPID ADVANCE cycle. It will be noted that the roller engaging surface 35 of the block 30 is longer than the respective surfaces of the blocks 31 and 29 and thereby will engage and depress the roller 34 of the unit 26 sufficiently long enough to permit the relatively slow feed movement of the slides and their cutters to complete a cutting pass across the rotating workpiece. The control block 29 is offset laterally outwardly of the saddle 16 and sufficiently beyond the blocks 30 and 31 to lie in the path of the roller 34 carried by the plunger 28 of the RAPID RETURN unit 27 so that its undersurface will engage the roller and depress the plunger to actuate the switch of this unit.

I have provided means by which the opposed tool slides are actuated in strict synchronization with each other throughout the RAPID ADVANCE, FEED and RETURN cycles and under all cutting load conditions encountered by the cutters operatively engaging, and fed into the rotating workpiece. Furthermore, such means as I employ for actuating the slides is characterized by its ability to eliminate backlash in the operation of the slides.

Referring now more particularly in this connection to FIGURES 5 through 7, as well as the diagrammatic FIGURES 8 through 11, I provide a pair of fluid cylinders 40 and 41 carried respectively by the saddles 16 and 17. Pistons 42 and 43, respectively, operate in these cylinders under the influence of fluid pressure delivered to and exhausted from the cylinders in the manner hereinafter to be described. The pistons are carried by piston rods 44 which are secured at their outer ends to the respective slides 14 and 15.

A flexible, relatively narrow metal non-stretchable band or tape 45 is secured at one end to the slide 15 as at 46 and extends through a tube 47 affixed to housing 48 and thence over an idler pulley or wheel 49 mounted at 49' in the housing. The opposite end of the band 45 is secured in an anchoring device 50 adjustably carried and secured on a rod 51. A tubular outer protective housing 52 for the tube 47 and the band 45 is secured at its ends to the saddles 16 and 17. The anchoring device is removably secured in position on the rod 51 by means of a fastener such as a set screw 53 having a cone-shaped pointed end projecting into a V circumferential groove 54 formed on the rod 51.

The rod 51 is slidably mounted in the housing 47 and is of sufficient length that its ends extend beyond the opposite ends of the housing to slidably support the same in the housing.

Valve means for obtaining a rate of motion of one slide that is the same as that of the opposed slide is shown generally at 60. This means is carried by a depending portion 61 of the forward slide and is mounted on the forward end thereof for movement therewith and for easy access for making the desired adjustment. The support 62 is bolted at 64 to the depending portion 61 and is provided with a boss 65 insertable in the groove or depresison 66 to firmly position the support in place. Slidably mounted in the support 62 is a stud 67 threaded on an end of a valve stem 68 and is provided with a key 69 operating in a keyway 70 for permitting axial movement of the stud but preventing its rotary displacement within the support 62. Coupled at 63 and 71 with the support 62 in the depending portion 61 is a valve body 72 separated by a plate 73 and a seal ring 74. The plate is perforated to receive the valve stem 68 and is provided with a seat 75 for one end of a coiled compression spring 76 surrounding a portion of the stem and which is seated at its other end in a seat 77 in the forward end of the stud 67. The spring 76 is placed under the desired degree of compression by turning the thumb nut 78 keyed to the stem 68. The stem is provided with fixed valve members 79 and 80 for controlling the flow of fluid between port 81 and either port 82 or port 83.

Passage 128 provides a communication between the ends of the valve and the atmosphere for free valve movement.

As will be seen from the drawings, the rear end of the stud 67 abuts the forward end of the rod 51 and is maintained in such abutting relation therewith under the adjusted selected compression of the spring 76. A protective housing 84, open at the bottom and at its forward end, overlies the thumb nut 78, is secured to the valve body 72 as at 85 and is sealed against the valve body by means of a seal ring 86. Housing 84 carries a seal ring 87 contacting the valve stem 68.

Figure 8:
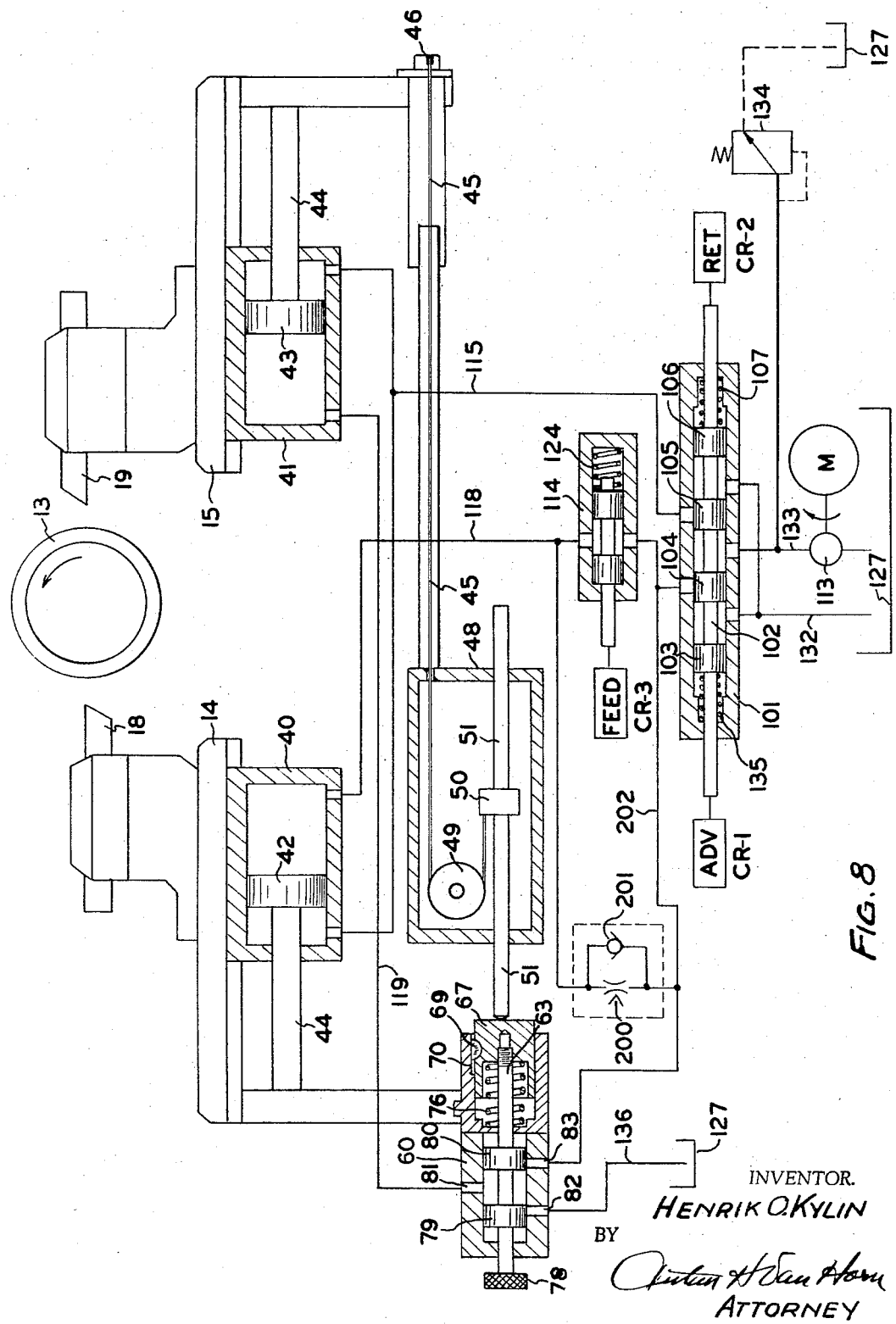
FIGURE 8 is a diagrammatic showing of the machine and hydraulic circuitry illustrating the relative positions of the slides and associated mechanism when the machine is at rest before the start of a cut.
Figure 9:
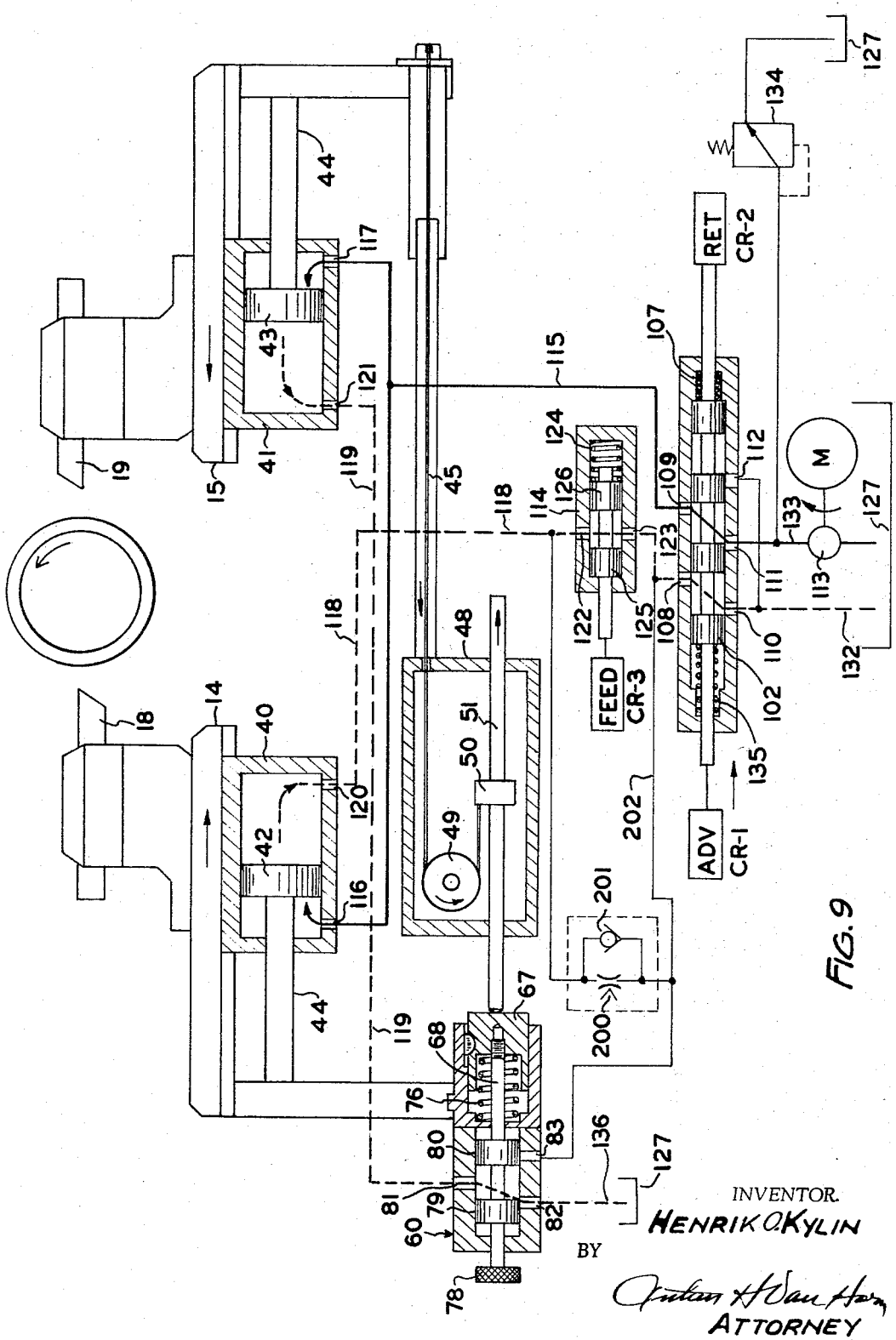
FIGURE 9 is a view similar to that of FIGURE 8 and illustrates the slides in RAPID TRAVERSE ADVANCE position.
Figure 10:
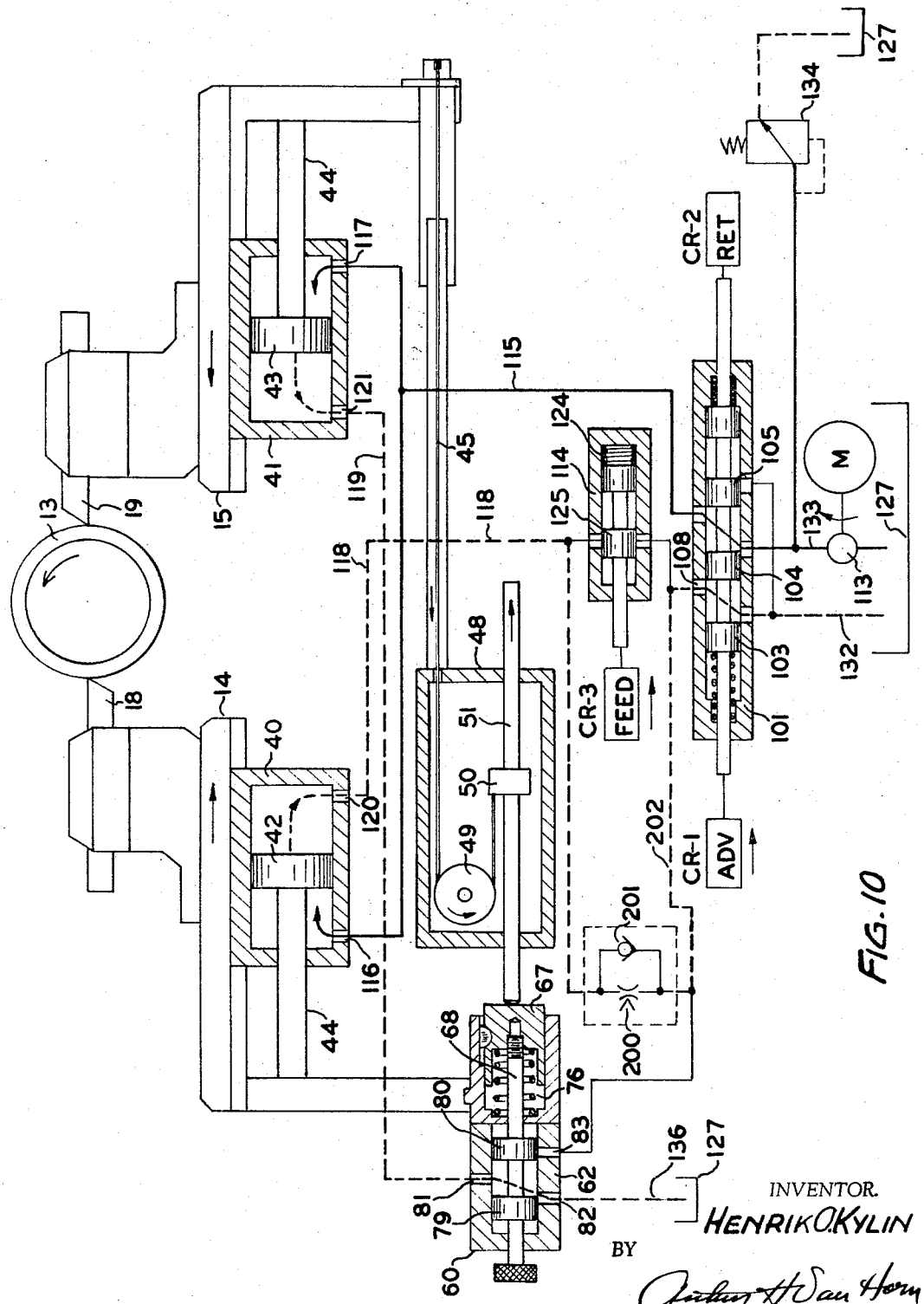
FIGURE 10 illustrates the several valve positions and the hydraulic circuits during the FEED movements of the slides.
Figure 11:
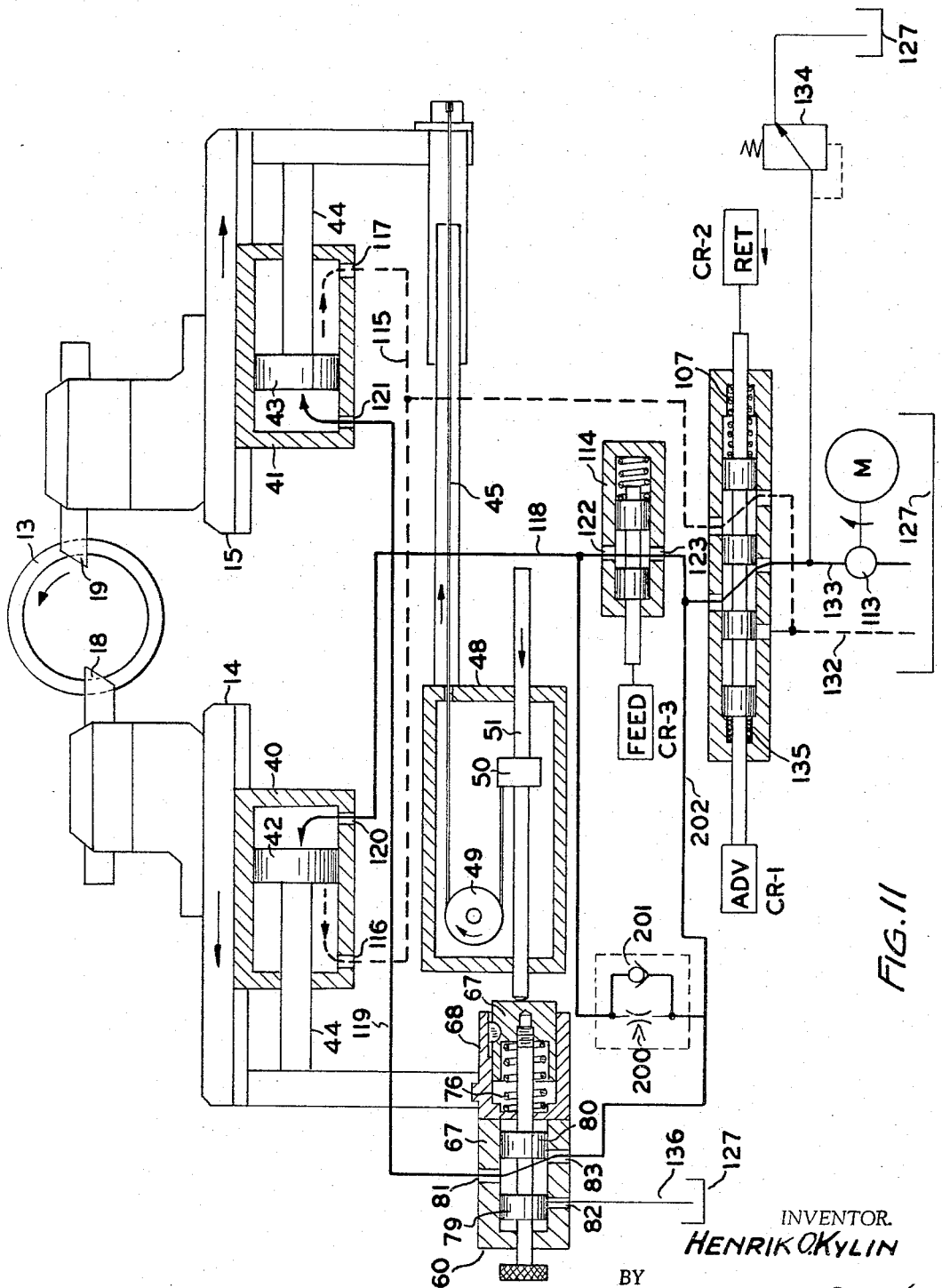
FIGURE 11 illustrates the several valve positions in the hydraulic circuit during slide RAPID TRAVERSE RETURN.

Referring now more particularly to FIGURES 8 to 11, inclusive, which diagrammatically illustrate the several steps in the complete cycle of synchronized operation of the slides and the tools carried thereby, beginning from the "AT REST" position shown in FIGURE 8 with the slides withdrawn and the cutter separated, FIGURE 9 illustrates the next step in the cycle, i.e. "RAPID TRAVERSE," while FIGURE 10 illustrates the succeeding step of "FEED." Finally, in FIGURE 11 are shown the relative positions of the mechanism in the "RAPID TRAVERSE RETURN" portion of the complete cycle of operation. After the slides have been returned through this step, the mechanism will return to the position shown in FIGURE 8 preparatory to repeating the complete cycle after advance of the workpiece 13 through the spindle and against an adjustable stop (not shown) provided for the purpose of determining the length of the piece being cut off. The complete cycle may be repeated as often as desired, either by manual or suitable automatic control means after each length of the piece is severed.

Referring to FIGS. 8, 9, 10 and 11, the source of fluid flow is pump 113 driven continuously by motor M. Fluid is supplied under pressure through line 133 to both the ADV–RET valve and to relief valve 134. Return flow line 132 communicates from the ADV–RET valve to sump 127. ADV–RET valve comprises a body 101, a valve stem 102 and a plurality of valve elements fixed on the stem as at 103, 104, 105 and 106. The valve body is provided with ports 108, 109, 110, 111 and 112, which in cooperation with the respective valve elements direct the fluid flow from line 133 to either of lines 115 or 202 and to direct the return flow to line 132.

During the advance phase of the motion cycle of the slides, the ADV valve solenoid is energized, causing valve stem 102 to move to the right as shown in FIGS. 9 and 10 and against the compression of the spring 107. This allows passage of fluid from the pump and internally through the valve between ports 111 and 109 and thence to line 115. Likewise, fluid may flow from line 202 and internally through the valve between ports 108 and 110 and thence to line 132 and to sump 127.

During the return phase of the motion cycle of the slides, the RET valve solenoid is energized causing valve stem 102 to move to the left as shown in FIG. 11 and against the compression of spring 135. This allows passage of fluid from line 133 through the valve to line 202, and likewise passage from 115 to line 132.

At any time when the slides are in a "no motion" condition, as shown in FIG. 8, neither the ADV nor the RET solenoid is energized and the compression springs 107 and 135 will cause valve stem 102 to move to an intermediate position blocking all flow through the valve. In this event all fluid flow from the pump will be delivered through the relief valve 134 and to sump 127.

A valve for changing the rate of flow to or from the cylinders actuating the slides from a relatively high rate of flow to a relatively low and subsequently adjustable rate of flow is shown generally at 114.

A valve stem having elements 125 and 126 is acted upon by a spring 124 to cause stem movement to the left against an unenergized solenoid FEED as shown in FIGS. 8, 9 and 11. This allows free internal fluid flow through the valve between ports 122 and 123 and subsequently free flow between the lines 118 and 202. FIG. 10 shows the condition at valve 114 when the solenoid FEED is energized to move the valve stem to the right compressing spring 124, valve element 125 blocking internal flow through the valve between lines 118 and 202.

At 200 is indicated a variable orifice to allow a restricted flow of liquid between lines 118 and 202 when flow is blocked by valve 114 as shown in FIG. 10. It is intended that this be what is known as a pressure compensated flow control valve to result in substantially uniform flow rate regardless of system pressures. This is well known in the art. At 201 is indicated a check valve that effectively allows free flow from line 202 to line 118 when flow is blocked at valve 114 and restricted at 200.

In describing the method of motion synchronization of the slides where motion of the slides is toward each other, as illustrated in FIGS. 9 and 10, FIG. 9 shows circuit conditions when in advance at a rapid rate and FIG. 10 shows circuit conditions when in advance at a feed rate. Flow of fluid is from pump 113 through line 133, ADV–RET valve, line 115 and thence through port 116 of cylinder 40 to be impressed against piston 42 connected to slide 14, and also through port 117 of cylinder 41 to be impressed against piston 43 connected to slide 15. Outward flow from cylinder 40 is through port 120, line 118, through valve 114 to line 202, as shown in FIG. 9, or through restriction 200 to line 202, as shown in FIG. 10 when valve 114 is shut off or closed, thence through the ADV–RET valve to line 132 and to the sump 127. Outward flow from cylinder 41 is through port 121, line 119, port 81 at valve 60 and through an orifice formed at the juncture of valve element 79 and port 82 and thence to line 136 and sump 127. Valve elements 79 and 80 of stem 68 and valve ports 82 and 83 are so displaced that when element 79 is displaced at port 82 to allow flow between ports 81 and 82, then element 80 is displaced to block flow between ports 81 and 83. Valve 60 with its ports 81, 82, 83 is securely coupled to slide 14 and piston 42 and moves with it. Valve stem elements 79 and 80 of valve stem 68 are coupled to slide 15 and piston 43 under the influence of spring 76 and stud 67, and rod 51 and anchoring device 50 and band 45 passing over pulley 49. When motion of each of the two slides 14 and 15 is toward or away from an intermediately placed reference point, motion of valve 60 outer member and of valve 60 stem member is in the same direction toward or away from the above mentioned reference point.

In the dynamic energy analysis of this circuit, it is understood that an energy level in the fluid is created or developed at the pump 113 by the motor M. This is an energy level substantially above atmospheric or sump energy level and must be sufficient to overcome all subsequent circuit frictional losses and to accomplish useful work. The same level of fluid energy, FIGS. 9 and 10, is available at port 116 of cylinder 40 and port 117 of cylinder 41. Fluid energy is transformed at piston 42 to useful work to move slide 14. Fluid energy still remains in the outwardly flowing fluid at port 120 to cause this fluid to flow through the remainder of this portion of the circuit and finally to line 132 and to sump 127. As outlined above, outward flowing fluid from cylinder 40 may flow freely through valve 114 or restrictedly through variable orifice 200 under the influence of FEED solenoid CR–3. Fluid energy is transformed at piston 43 to useful work to move slide 15. Fluid energy still remains in the outwardly flowing fluid at port 121 to cause this fluid to flow through the remainder of this portion of the circuit including valve 60 and finally to line 136 and sump 127.

It is well understood in fluid mechanics that when considering the flow of a fluid through a passage or an orifice, there is a finite relationship between rate of flow, flow resistance of a passage or orifice and fluid energy level on each side of the passage or orifice.

When the circuit is as shown in FIG. 9, the rate of travel of slide 14 and the rate of outward fluid flow from cylinder 40 will be determined by the fluid energy level at port 120 and the restrictive value of the circuit passages, line 118, through valve 114, line 202 leading to ADV–RET valve, through this valve and line 132 to the sump.

When the circuit is as shown in FIG. 10, the rate of travel of slide 14 and the rate of outward fluid flow from cylinder 40 will be determined by the restrictive effect of variable orifice 200 inasmuch as this is a type that maintains a rate regardless of fluid energy levels. In this manner, a level of fluid energy is established at port 116, and is the same at port 117.

In order to maintain this energy level at port 117, the outward flow from cylinder 41 must be restricted by valve 60 by lateral displacement of element 79 and port 82. The size of the orifice at 82 is responsive at all times to the pressure drop on the exhaust side of piston 43 in cylinder 41. Configurations of element 79 and port 82 are such that very minor displacement thereof will result in a relatively large change in restrictive value. It is now seen that since slide 14 is connected to port 82 and slide 15 is connected to element 79, as slide 14 advances, slide 15 will advance at the same rate within a very high degree of accuracy.

FIG. 11 shows in diagram the fluid circuit in effect during the rapid traverse return portion of the cycle. Fluid flow is from the pump 113 to line 133, through ADV–RET valve to line 202. One branch circuit is through valve 114 or check valve 201 to line 118 and then to port 120 to impress fluid pressure upon piston 42 to cause outward motion of slide 14, as indicated by the arrow on this slide. Another branch circuit is through valve 60 by way of a restriction at the juncture of port 83 and element 80, thence port 81, line 119 and port 121 to impress fluid pressure upon piston 43 to cause outward movement of slide 15. The outward flow of fluid from cylinder 40 and the outward flow of fluid from cylinder 41 combine and flow through line 115, the ADV–RET valve, line 132 and thence to sump 127. Inasmuch as the outward flow from both cylinders are combined and together return to the sump 127, the fluid energy level in the outward flow end of each cylinder is the same. The energy level created at the pump is the energy required to carry fluid to piston 42 through various line and valve element restrictions plus the energy to move slide 14 plus the energy to return the fluid from cylinder 40 back to the sump. This same energy level is maintained at port 83 of valve 60. In order to maintain this energy level as fluid flows through valve 60 and thence to cylinder 41, there to be in part transformed to energy to move slide 15 and then to have an energy level the same as that at the outward end of cylinder 40, the restriction at port 83 and element 80 is self regulatory by lateral displacement of port 83 and element 80. It is now seen that since slide 14 is connected to port 83 and slide 15 is connected to element 80, as slide 14 returns, slide 15 will return at the same rate with a very high degree of accuracy.

Referring again to FIGS. 8, 9, 10 and 11 and the above description, it can be seen that a definite position relationship exists between ports 82 and 83 and the slide 14 and any cutting tool that might be mounted thereon, as at 18. Likewise, a definite position relationship exists between valve elements 79 and 80 and the slide 15 and any cutting tool that might be mounted thereon, as at 19. This latter relationship is in part brought about by the distance relation between the face of stud 67 where it contacts rod 51 and valve elements 79 and 80. This distance may be readily changed by turning the thumb nut 78. When the machine is doing useful work such as cutting off a workpiece, the relation of the cutter mounted on slide 15 may be readily adjusted relative to the cutter mounted on slide 14.

The electric circuit for initiating and maintaining the various phases of the fluid flow circuitry is shown diagrammatically in FIGS. 12, 13, 14 and 15. Reference is made to switch controlling elements shown in FIGS. 3 and 4.

FIG. 12 shows circuitry wherein a STOP–START switch 100 is shown in a stop position thereby de-energizing all electric circuits and effecting a fluid flow circuit as shown in FIG. 8. Switch 100 may be located at some position as shown in FIG. 2. It is presumed that the various switch control elements are in the positions shown in FIG. 3, whereby control block 31 is engaging switch 25 also indicated as LS–1. When the STOP–START switch 100 is positioned to START and this position is maintained as shown in FIG. 13, control relay CR–1 is energized causing relay contact CR–1 to close and thereby energize the ADV solenoid of the ADV–RET valve. This results in a fluid flow circuit as shown in FIG. 9, and causes the slides 14 and 15 to advance at a rapid rate. Simultaneously a circuit is established through switch LS–3 and a relay CR–1 contact to provide a second electrical path for energization of relay CR–1. As control block 31 carried by slide 14 advances, LS–1 is disengaged but relay CR–1 remains energized through the secondary path described.

When slide 14 advances to the position whereby contact block 30 effectively engages switch 26 also indicated as LS–2, an electric circuit as shown in FIG. 14 is established. LS–2 allows control relay CR–2 to be electrically energized causing relay contact CR–2 to close and thereby energize the FEED solenoid resulting in the fluid flow circuit as shown in FIG. 10 and causing slides 14 and 15 to advance at a feed rate.

When slide 14 advances to the position whereby contact block 29 effectively engages switch 27 also indicated as LS–3, an electric circuit as shown in FIG. 15 is established. The circuit previously established for energizing control relay CR–1 through switch LS–3 is broken resulting in the breaking of the circuit also previously established energizing the ADV solenoid. A circuit is established energizing control relay CR–3 through switch LS–3 causing relay contact CR–3 to close and thereby energize the RET solenoid of the ADV–RET valve. Simultaneously a circuit is established through switch LS–1 and a relay CR–3 contact to provide a second electrical path for energization of relay CR–3. A fluid flow circuit is established that causes slides 14 and 15 to return at a rapid rate. The circuit is as shown on FIG. 11 except that because of the relatively long switch engaging surface of contact block 30, LS–2 is still engaged to effect a circuit to energize the solenoid FEED of valve 114. Fluid flow through valve 114 is still effectively blocked and fluid must flow from line 202 through check valve 201 to line 118. When slide 14 has returned to the position whereby contact block 30 no longer engages switch LS–2, the circuit to the FEED solenoid is broken and fluid flow through valve 114 is established as shown on FIG. 11. As control block 29 carried by slide 14 returns, LS–3 is disengaged but control relay CR–3 remains energized through the secondary path described.

Return motion to slide 14 continues until control block 31 engages switch 25, thereby breaking the circuit to CR–3 and subsequently the RET solenoid and establishing the circuit to CR–1 and subsequently the ADV solenoid as shown in FIG. 13. This re-establishes advance at a rapid rate and the cycle of motions of the slides will repeat. At any time during the operations as described, the STOP-START switch may be employed to break all electric circuitry and effectively result in a stoppage of fluid flow to the cylinders 40 and 41 and stop the motion of slides 14 and 15.

By virtue of the unique apparatus and control means herein disclosed, it will be seen that I have provided a relatively simple automatic cycling for the rapid advance, feed and rapid return of opposed slides coacting in strict synchronism with one another to complete a work cycle on a piece without the disadvantage of the effects of backlash, lost motion or the like.

Likewise I have provided a simple means for changing the position relationship of one of the coacting slides with respect to the other at any time during the rapid advance, feed, and return movement of the slides.

Various changes may be made in the details of construction and arrangement of parts of the invention without departing from the spirit thereof or the scope of the appended claims.

I claim:

1. In a machine tool, a rotatable work support, means for rotating the support, a pair of tool slides disposed for movement simultaneously in opposed directions transversely of the axis of a workpiece in said rotatable support and through advance, feed and return cycles hydraulic means including a source of fluid pressure, a slide rate control valve, a rapid advance and return valve and a feed valve, means actuated by said control valve and a first slide and connected with a second slide for movement thereof in response to movement of the first slide for transmitting such movement at a predetermined rate to the second slide, means energized by the several positions of said first slide within its limit of movement for effecting operation of said valves whereby to establish advance, feed and return movements at selected rates in said slides.

2. The invention defined in claim 1, wherein the rate of movement established in the first slide is equal to the rate established in the second slide.

3. The invention defined in claim 1 wherein said control valve actuated means connecting said first and second slides includes a flexible, non-stretchable member.

4. The invention defined in claim 1 including hydraulically actuated means associated with the said first and second slides operable to regulate the rate of movement of the second slide.

5. In a machine tool, a rotatable work support, means for rotating the support, a pair of tool slides disposed for movement simultaneously in opposed directions transversely of the axis of a workpiece in said rotatable support and through advance, feed and return cycles, hydraulic means including a source of fluid pressure, a slide rate control valve, a rapid advance and return valve and a feed valve, means actuated by said control valve and a first slide and connected with a second slide for movement thereof in response to movement of the first slide for transmitting such movement at a predetermined rate to the second slide, said last named means including an inflexible member in engagement with a portion of said control valve, a non-stretchable flexible member connecting the second slide with said inflexible member whereby a controlled rate of movement may be imparted to said slides, means energized by the several positions of said first slide within its limit of movement for effecting operation of said valves whereby to establish advance, feed and return movements at selected rates in said slides.

6. In a machine tool, a rotatable work support, means for rotating the support, a pair of tool slides disposed for movement simultaneously in opposed direction transversely of the axis of a workpiece in said rotatable support and through advance, feed and return cycles, hydraulic means including a source of fluid pressure, a slide rate control valve, a rapid advance and return valve and a feed valve, means actuated by said control valve and a first slide and connected with a second slide for movement thereof in response to movement of the first slide for transmitting such movement at a predetermined rate to the second slide, said last named means including an inflexible member in engagement with a portion of said control valve, a non-stretchable flexible member connecting the second slide with said inflexible member whereby a controlled rate of movement may be imparted to said slides, means energized by the several positions of said first slide within its limit of movement for effecting operation of said valves whereby to establish advance, feed and return movements at selected rates in said slides, and adjustable means associated with said control valve to preselect the relative positions of the first and second slides.

7. In a machine tool, a rotating work carrier, a pair of tool carrying slides disposed for movement in directions substantially transverse to the work carrier, hydraulic motor powering means for each slide, hydraulic means for establishing direction and rate of movement to one of said slides, hydraulic means for establishing direction of movement to the other of said slides, hydraulic means associated with the movement of the two slides whereby the rate of movement established in the one slide is equal to the rate of movement in the other slide.

8. In a machine tool, a rotating work carrier, a pair of tool carrying slides disposed for movement in directions substantially transverse to the work carrier, hydraulic motor powering means for each slide, hydraulic means for establishing direction and rate of movement to the first of said slides, hydraulic means for establishing direction and rate of movement to the second of said slides, said last named hydraulic means including a hydraulic valve operatively associated with said two slides whereby said valve operatively associated with the slides is fixed to and movable with said first slide.

9. The invention defined in claim 8 including means for selecting the position of the second slide relative to the position of the first slide and the work carrier.

References Cited by the Examiner
UNITED STATES PATENTS

| | | | |
|---|---|---|---|
| 2,499,509 | 3/1950 | Kendall | 82—25 |
| 2,562,266 | 7/1951 | Gamble | 82—25 X |
| 2,701,496 | 2/1955 | Wilson | 82—45 |
| 2,757,546 | 8/1956 | Kendall et al. | 82—25 X |

WILLIAM W. DYER, JR., *Primary Examiner.*

LEONIDAS VLACHOS, *Examiner.*